March 23, 1937.    R. G. FRYE    2,074,581

PISTON FOR ENGINES

Filed Jan. 6, 1934

Inventor

ROBERT G. FRYE

By *Finckel & Finckel* his Attorneys

Patented Mar. 23, 1937

2,074,581

UNITED STATES PATENT OFFICE 2,074,581

PISTON FOR ENGINES

Robert G. Frye, Norwich Township, Franklin County, Ohio

Application January 6, 1934, Serial No. 705,563

2 Claims. (Cl. 309—15)

This invention relates to pistons for engines and more particularly to the species in which the piston is reciprocated in a cylinder to drive a crank shaft with an oscillating connecting rod.
Because the connecting rod in such an engine oscillates in a plane there is a lateral pull or push on the piston tending to cant it and wear down the wall of the cylinder at opposite sides in a plane coinciding with the plane of operation of the connecting rod, or so that a cross section of the cylinder becomes ellipsoidal thus resulting in gaps for the passage of gases and oil. The only remedy in practice for such a condition has been a reboring of the cylinder and the provision of new piston or ring of larger diameter.

Various means have been proposed for compensating or minimizing such wear, and the principal object of my invention is to provide an improved construction wherein such wear, especially in the zone of travel of the piston head, is so far avoided as to be practically negligible. Other objects incidental to the principal one will appear from the disclosure.

My invention is embodied in the example and modification herein shown and described, the feature of novelty being finally claimed.

In the accompanying drawing—

Figure 1:
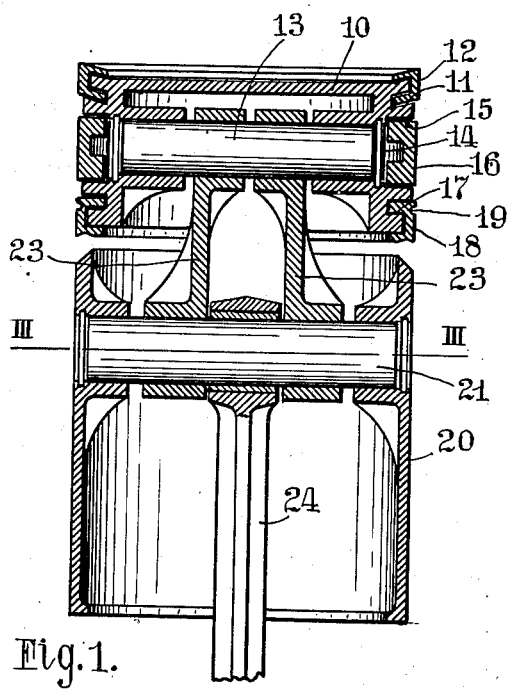
Figure 1 is a view mainly in central section of one embodiment of the invention.
Figure 2:
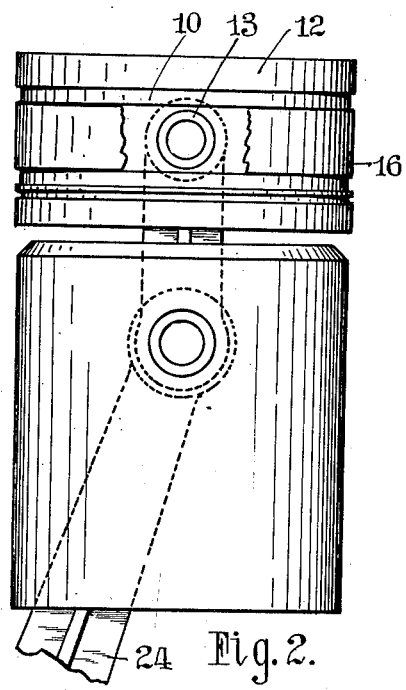
Fig. 2 is an elevation looking at the right hand side of Fig. 1 with a portion broken out.
Figure 3:
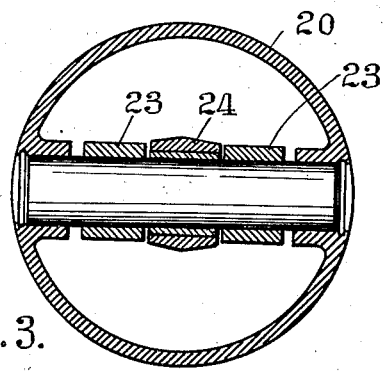
Fig. 3 is a cross section on the line III—III Fig. 1, looking down, the wrist pin being in pull.

In the views the character 10 designates the body of the piston head, said head being made with an annular groove 11, parallel faces forming a lip around the upper end of its rim, said groove and lip having a similar slant upward and outward. Fitting in said groove and on said lip is an internally hollow spring ring 12 having slanting legs, the upper of which laps on the aforesaid upwardly and outwardly slanting lip of the piston head when the ring is applied thereto as shown.

The head portion of the piston is provided with opposed diametrical seats for a pin 13 which is held from longitudinal protrusion on said seats by a spring ring 14. The piston head is provided with an external annular groove 15 in the plane of the pin in which is fitted a spring 16 of U-shaped cross section. This ring I term a guide ring its functions being to confine the pin and hug the wall of the cylinder in the reciprocations of the piston and aid in preventing leakage.

The lower end of the piston head is provided with an annular groove 17 in which is fitted the upper leg of another spring ring 18, the latter being provided with a vacuum groove 19 extending therearound thereby producing a tendency of the ring to hug the cylinder wall.

20 designates the skirt member, it being a distinct structure separable from the head member but having a swinging connection with said head member. The skirt member 20 is provided with a wrist pin 21. The swinging connection between the piston skirt and head member consists of link-like member or members 23, 23, each having bosses fitting on the wrist pin of the skirt member and the pin 13 of the head member. The link-like members 23, 23 are spaced apart at their lower ends to provide room for connecting therewith of one end of the connecting rod 24, said connecting rod being connected, as usual, at its other end with the crank shaft (not shown) of the engine. The pin 13 is longitudinally parallel to the pin 21.

From this construction it will be observed that the side pressure of the pull and push of the connecting rod is borne by the comparatively long skirt and not by the head member of the piston because said head member being pivoted to the pin of the skirt member is merely guided by the wall of the cylinder. Moreover because the pin 13 is longitudinally parallel to the wrist pin 21 the direction of the thrust of the skirt member is parallel to and not crosswise of the axis of the pin 13 hence the lateral pressure of the thrust or pull is not communicated in a direction transverse the pin 13 which would cause the head member to veer toward the wall of the cylinder.

The inwardly slanting U-shaped cross section of the piston ring fitting in a similarly slanting groove and on the lip at the top of the piston head as shown in Fig. 1 favors the prevention of pressure, gas and oil leakage past the rims of the rings because when the explosion takes place pressure tends to be exerted on the upper leg of the ring to close it on the top of the piston head and excessive pressure on the cylinder wall by the ring is lessened because the lower leg rides on the inclined wall of the groove containing said lower leg. In other words both legs of the piston ring in all positions hug the lip on which the ring is placed. Also when said upper leg is slanting upward and outwardly, the explosion pressure tends to force said ring outwardly toward and into contact with the wall of the cylinder thereby increasing the sealing effect.

Figure 4:
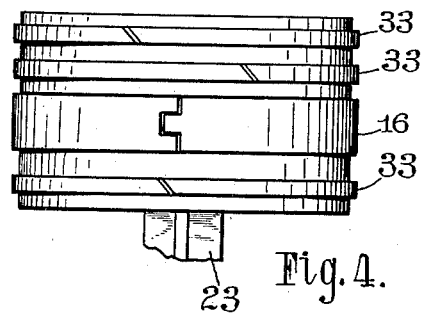
Fig. 4 is a side elevation of a piston head having standard rings with my guide ring applied.

However the principal features of the invention can be embodied in a construction in which the head portion is provided with ordinary rings such as shown at 33 in Fig. 4.

The forms of the parts can be changed without departing from the gist of the invention as claimed.

What I claim is:

1. A piston having at the top of its head portion an annularly and upwardly and outwardly flared lip, said lip bounding an annular groove below said lip and groove, said lip and groove each having parallel faces and a piston ring of generally U-form in cross section having parallel legs fitting and sliding on both sides of said lip and in said groove.

2. A piston including a skirt portion and a head portion having piston rings at its top and bottom, a wrist pin in said skirt portion, and a transverse pivoting pin in said head portion mounted substantially centrally in said head portion between the piston rings thereof, said wrist pin and the pin of the head portion being longitudinally parallel to each other, and link means connecting said pins.

ROBERT G. FRYE.